Feb. 18, 1936.     M. A. TIRABASSO     2,031,393
VEHICLE JACK
Filed June 12, 1933      8 Sheets-Sheet 1
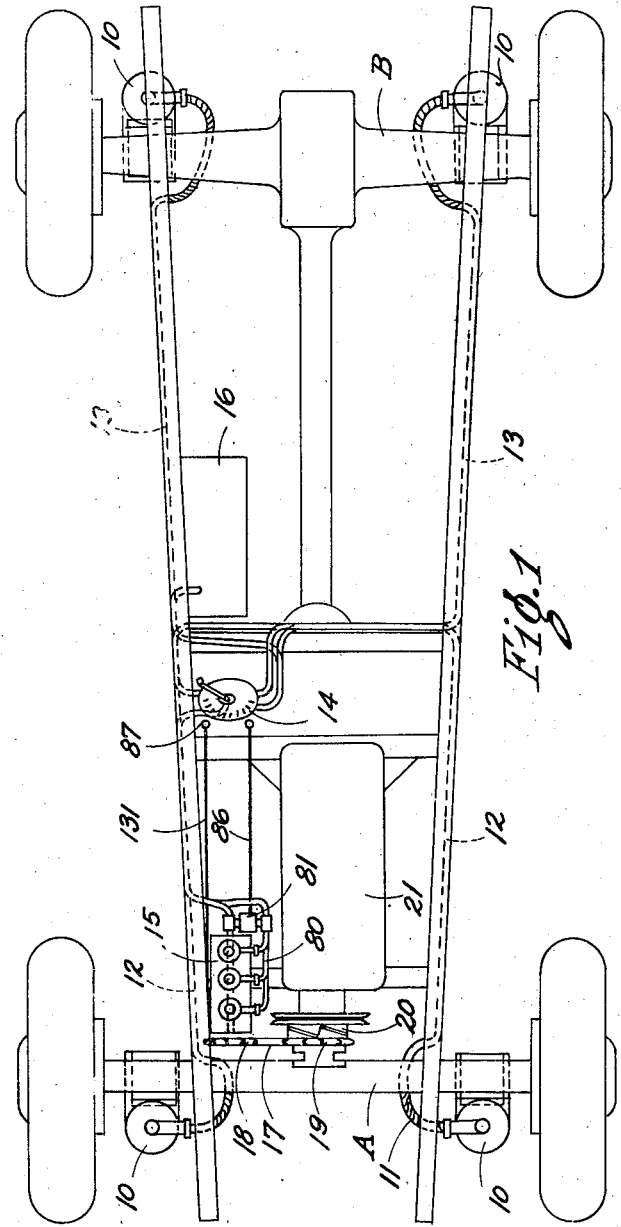
INVENTOR
MICHIAL A. TIRABASSO
BY
ATTORNEYS

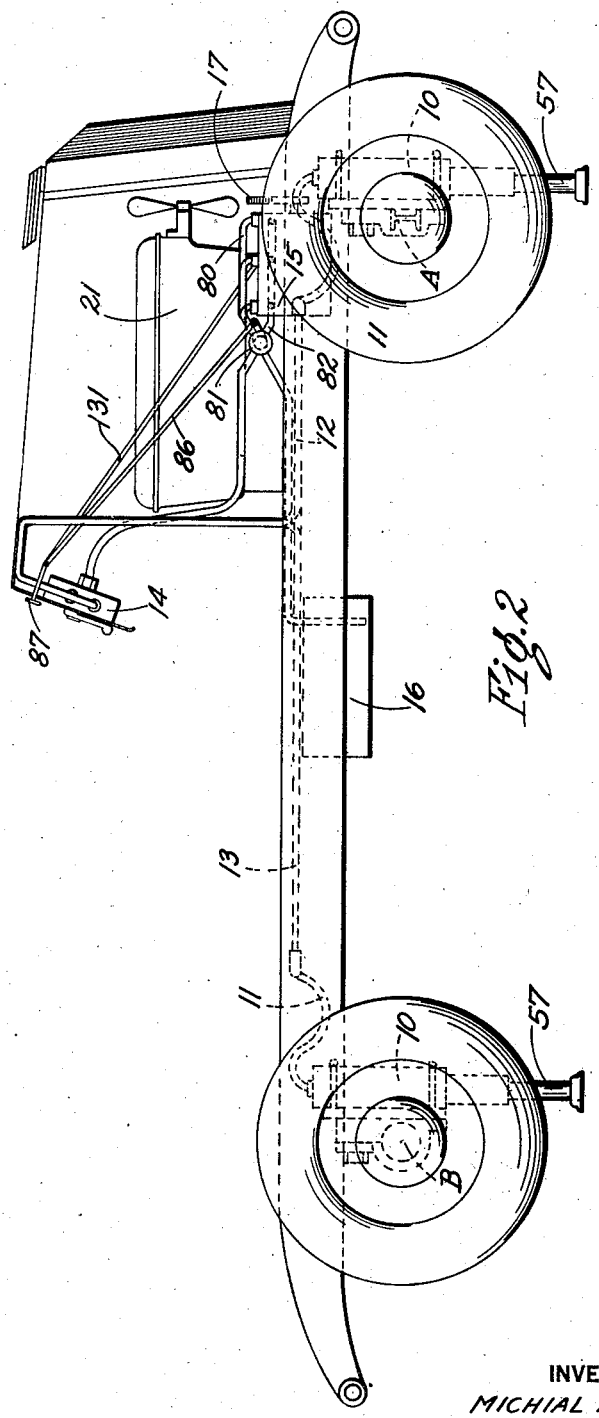

Feb. 18, 1936.  M. A. TIRABASSO  2,031,393
VEHICLE JACK
Filed June 12, 1933  8 Sheets-Sheet 3
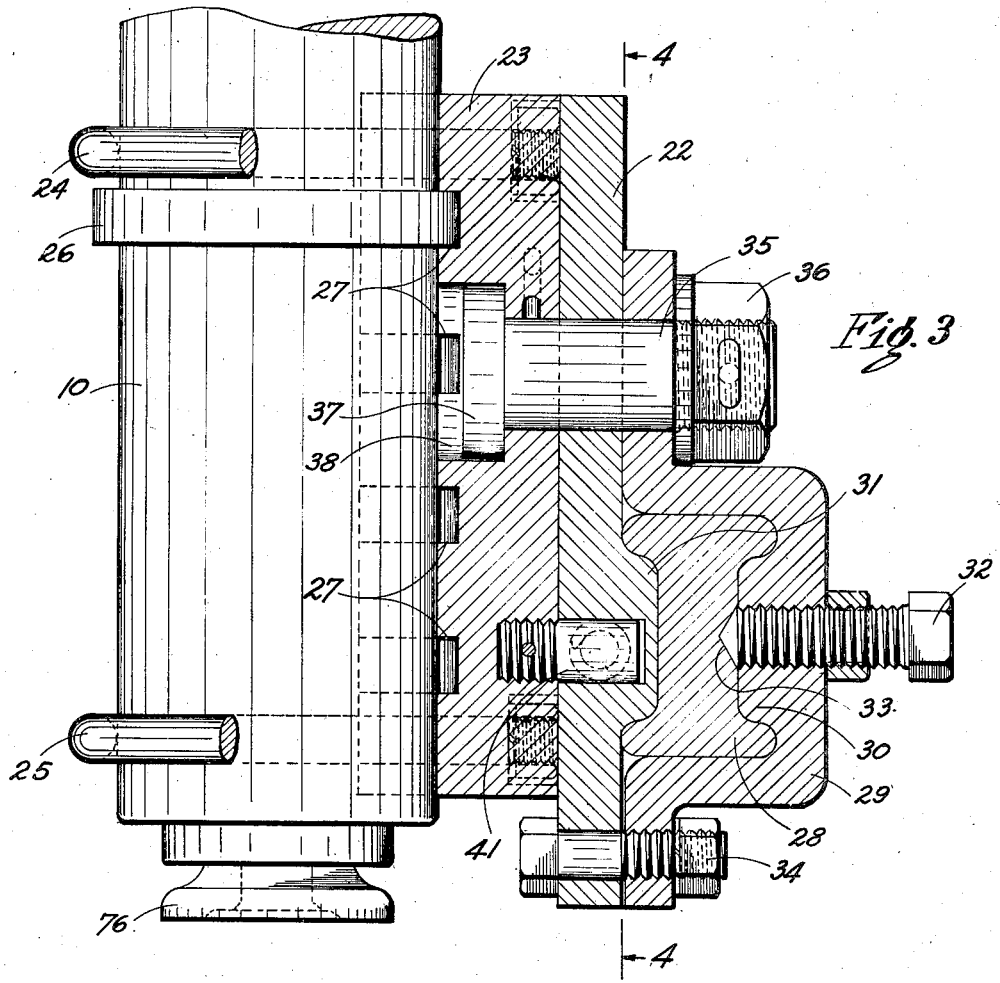
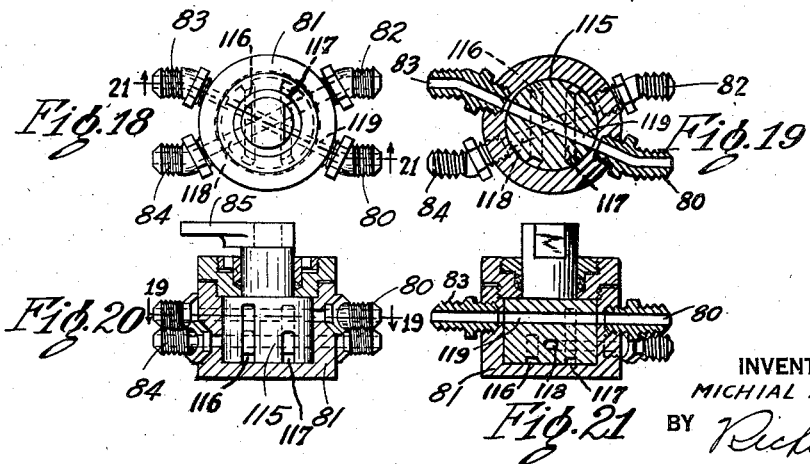
INVENTOR
MICHIAL A. TIRABASSO
BY
ATTORNEYS Feb. 18, 1936.   M. A. TIRABASSO   2,031,393
VEHICLE JACK
Filed June 12, 1933   8 Sheets-Sheet 4

INVENTOR
MICHIAL A. TIRABASSO
BY
ATTORNEYS

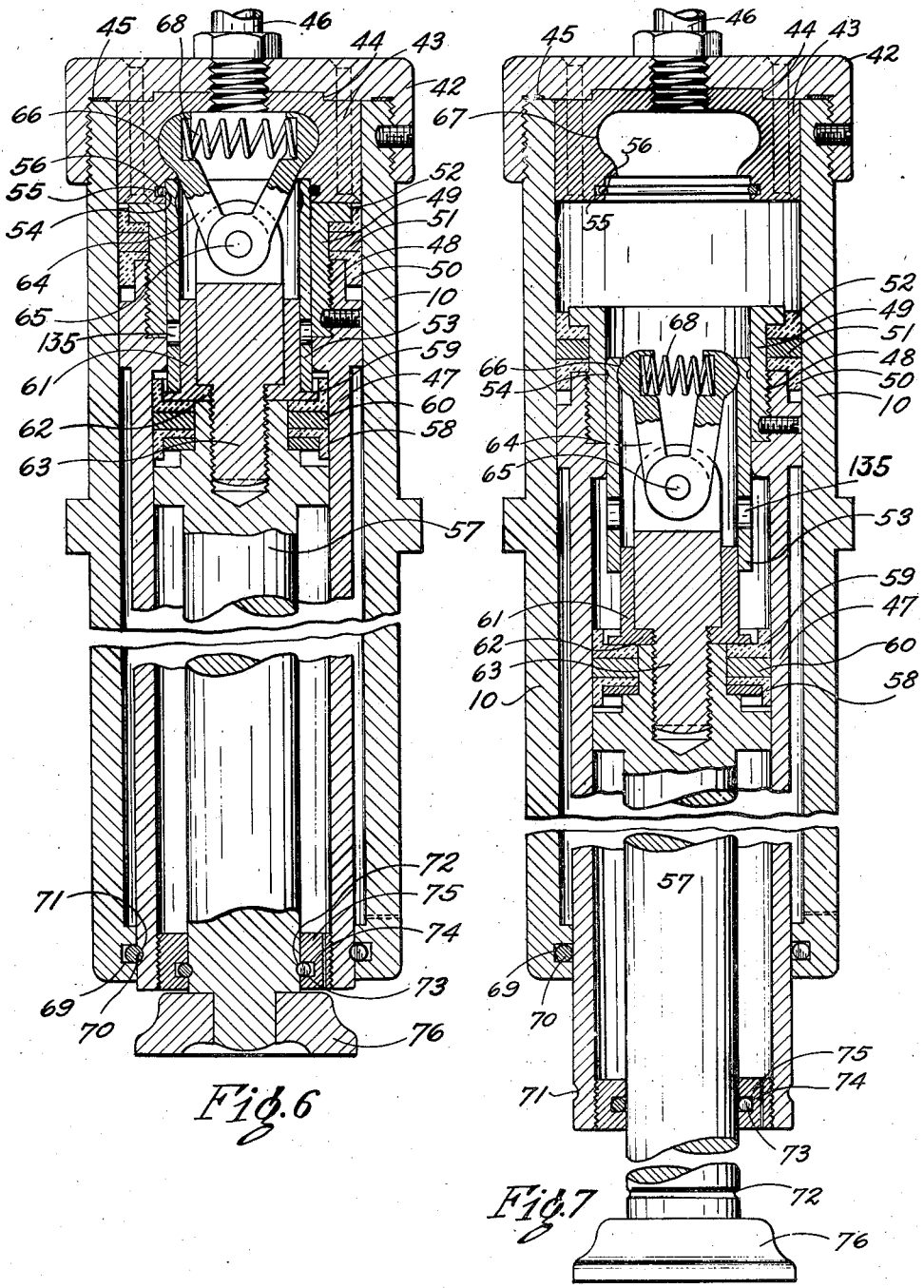

Feb. 18, 1936.  M. A. TIRABASSO  2,031,393
VEHICLE JACK
Filed June 12, 1933   8 Sheets-Sheet 6
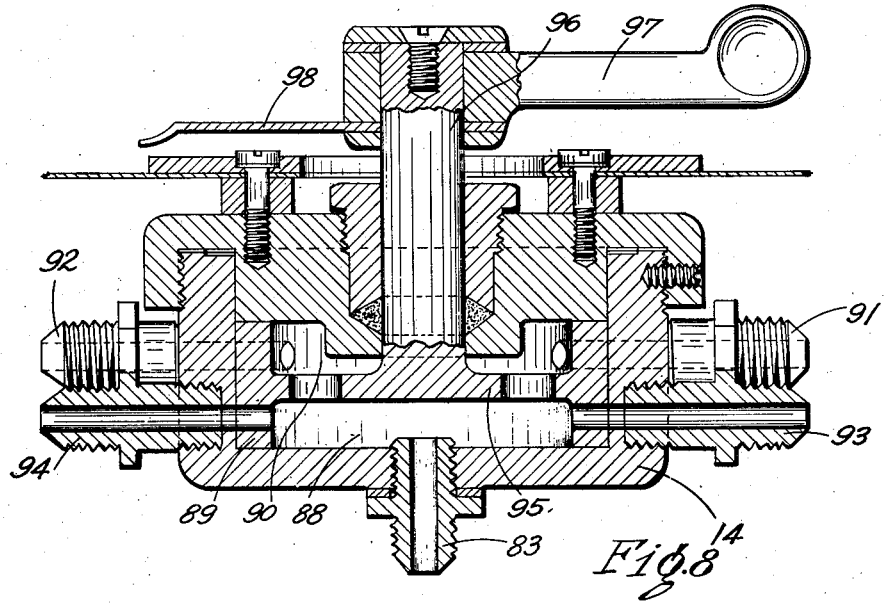
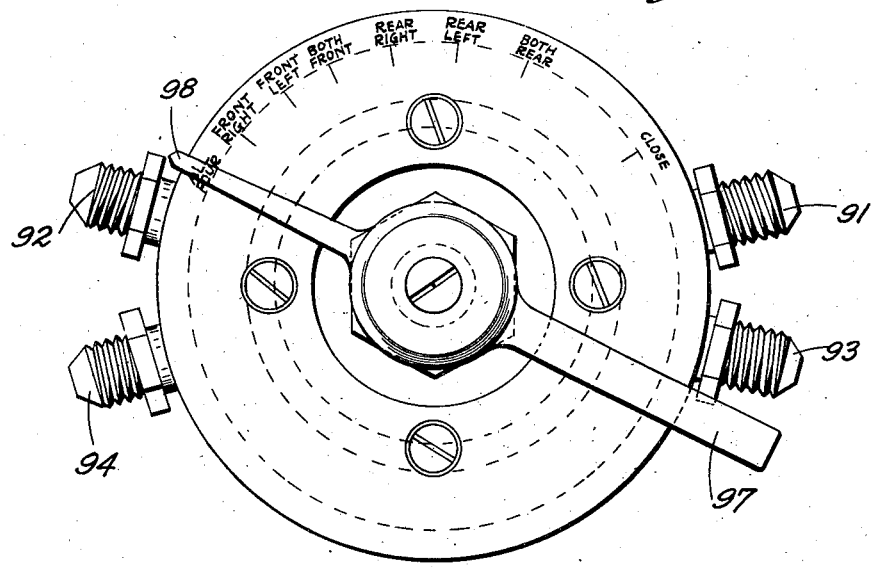
INVENTOR
MICHIAL A. TIRABASSO
BY
ATTORNEYS Feb. 18, 1936. M. A. TIRABASSO 2,031,393
VEHICLE JACK
Filed June 12, 1933   8 Sheets-Sheet 7

Inventor
MICHIAL A. TIRABASSO
By
Attorneys

Feb. 18, 1936.   M. A. TIRABASSO   2,031,393
VEHICLE JACK
Filed June 12, 1933   8 Sheets-Sheet 8

INVENTOR
MICHIAL A. TIRABASSO
BY
ATTORNEYS

Patented Feb. 18, 1936

2,031,393

UNITED STATES PATENT OFFICE 2,031,393

VEHICLE JACK

Michial A. Tirabásso, Cleveland, Ohio

Application June 12, 1933, Serial No. 675,380

5 Claims. (Cl. 254—86)

This invention relates broadly to lifting jacks for motor vehicles and more specifically to improvements therein including mechanism for operating a plurality of hydraulic jacks which are arranged upon the axles of an automobile adjacent each wheel thereof and organized for control either single or in multiple.

One of the objects of this invention is to provide a jack which may be mounted upon a vehicle axle in suitable spaced relation with the ground to afford adequate road clearance therewith and which is constructed with sufficient lifting stroke to elevate the vehicle wheel from the ground irrespective of the irregularities of the surface with which the jack may be engaged.

Another object of this invention is to construct a jack which is adapted to effectuate the automatic adjustment of the jack in a plane normal to the road surface where one wheel is elevated and the axle is fulcrumed about the opposite wheel.

A further object of this invention is to provide an organization of lifting elements for an automobile which is operable from a control unit common to all the lifting elements to accommodate the actuation of any of the lifting members or the elevation of all the wheels simultaneously.

Another object of the invention is to provide mechanism for effecting the circulation of fluid under pressure to the several lifting units and a power transmission coupling therefore which is coordinated for operative control with the vehicle engine.

Another object of the invention is to construct a valve which is adapted to effect the expansive or retractive movement of the ram in the lifting jack independent of the directional drive of the fluid displacement motor.

A still further object is to provide an automobile running gear jack which is relatively light in weight, economic of manufacture and adaptable for use upon an automobile chassis without structural modification therein.

In the drawings wherein there is illustrated the preferred embodiment of the present invention—

Figure 1 is a diagrammatic plan view of a vehicle chassis illustrating the arrangement of the vehicular jacks, the fluid circulatory conduits and connections therefor and the fluid transmission mechanism and control units.

Figure 2 is an elevational view of the chassis shown in Figure 1 and including the lifting jacks as positioned in elevating the vehicle wheels.

Figure 3 is a detail view, partially in section, illustrating the supporting connections between the jack and one of the vehicle axles.

Figure 6 is a vertical sectional view through the body of the jack illustrating the structure of the ram.

Figure 7 is a vertical sectional view of the jack illustrated in Figure 6, the ram being shown herein in its actuated position.

Figure 8 is a vertical sectional view through the fluid control valve.

Figure 9 is a plan view of the same.

Figure 18 is a plan view of the reversing valve which is coordinated with the fluid displacement motor.

Figure 19 is a transverse sectional view on line 19—19 in Fig. 20 of the valve shown in Figure 18, the core of said valve being shown in its actuated position.

Figure 20 is a vertical sectional view of the reversing valve shown in Figure 18.

Figure 21 is a similar view on line 21—21 in Fig. 18 of the valve shown in Figure 20, the core member thereof being shown in its actuated position.

Figure 4:
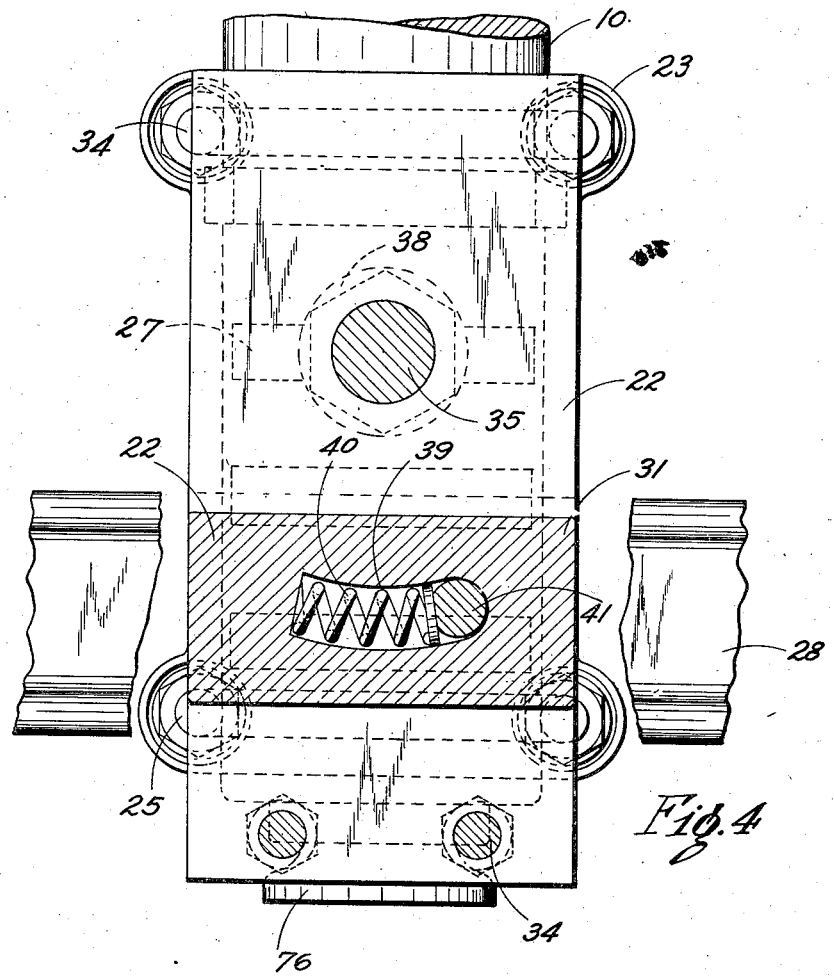
Figure 4 is a vertical section of the connections illustrated in Figure 3, the section being taken on a plane indicated by the line 4—4 in Figure 3.

Referring to Figures 1 and 2 the vehicle lifting jacks 10 are mounted upon the front and rear axles A and B, respectively, of an automobile chassis of conventional form. In the instant case the jacks are disposed adjacent the inner faces of each of the vehicle wheels and relatively close thereto. The jacks are of the fluid operated type having flexible connections 11 associated therewith which communicate with conduits 12 and 13 leading to a control valve 14, a displacement motor 15 and a reservoir 16. The pump 15 may be driven by any suitable transmission gearing, such for instance as the chain 17, sprockets 18 and 19 and coupling member 20 which is operatively coordinated with the crank shaft of the vehicle engine 21.

Figure 5:
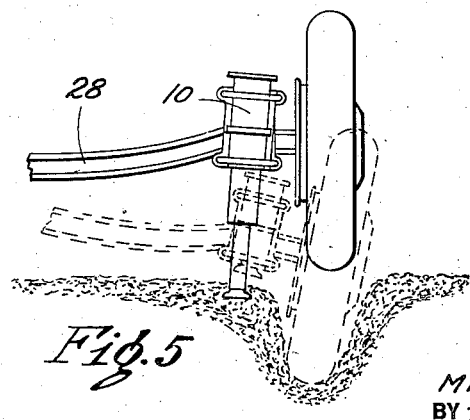
Figure 5 is a front elevational view of one of the vehicle wheels, a fragmentary portion of the axle and the vehicular jack, including, in solid outline, the actuated position of the assembly after the wheel has been elevated from the ground.

In the preferred embodiment the vehicular jack is constructed to accommodate its support upon a mounting plate which is adapted for application upon various types or models of automobile axles. In Figure 3, wherein there is illustrated one of the front axle mounting devices, which may be taken as typical of any of the supporting units, the support comprises a plate 22 having a pillow block 23 pivotally mounted thereon. The face of the block 23 is recessed to receive the casing of the jack 10 which is clamped thereon by U-bolts 24 and 25 anchored upon the block 23 through nuts in threaded engagement upon the ends thereof and embedded in countersunk recesses in the block 23. Adjacent the upper end of the jack casing or cylinder 10 there is an annular bead 26 which is provided for engagement with one of a series of grooves 27 formed in the inner face of the pillow block 23. When making an installation of one of the vehicular jacks upon a vehicle chassis the flange 26 is mounted within the groove 27 best suited to facilitate sufficient axle clearance relative to the road and elevation with respect to the tire size. The plate 22 is anchored upon the vehicle axle 28 by a clamping plate 29 which, as shown, is provided with a boss 30 on the inner face thereof for engagement with the contour of the face of the axle. The plate 22 is likewise formed with a boss or rib 31 which is formed for intimate engagement with the opposed face of the axle. The central body portion of the clamping plate 29 is drilled and tapped to receive a set screw 32 which engages a depression 33 spot drilled in the forward face of the web of the axle 28. The plate 22 is secured upon the clamping plate 29 by cap screws 34 and further by a trunnion bolt 35 having a nut 36 thereon positioned against the outer face of the clamping plate. The inner end of the trunnion bolt 35 is formed with an enlarged head 37 which is seated within a counter bore 38 in the pillow block 23. Within the body of the plate 22 there is a recess 39 which receives a coiled compression spring 40, the free end whereof engages a stud 41 mounted in the pillow block 23. The recess 39 is arcuated so that the pin or stud 41 may travel freely therein when the plate 22 is oscillating about the center of the trunnion bolt 35. As shown in Figure 5, when one of the vehicle wheels falls into a rut or similar depression in the road surface or when the tire is deflated the axle will be lowered upon one side of the vehicle and the axes of the jack will be disposed at an angle divergent to a perpendicular from the road surface. When the wheel is elevated the axle is fulcrumed upon the opposite wheel and the jack, as herein constructed, is oscillated about the trunnion 35 thus shifting the axis of the jack to a position normal to the plane of the road. When the ram is retracted the spring 40 effects the return of the jack body to its normal position upon the axle.

The structure of each of the jack units comprises an outer casing or cylinder 10 having a cap 42 screw threaded upon the upper end thereof. The cap is provided with a head 43 riveted or otherwise secured upon the inner face of the cap and is formed with a recess 44 which receives a shouldered extension of the head 43 and thus centralizes the cap 42 with the bore of the cylinder. Intermediate the end wall of the cylinder and the cap there is a gasket 45 provided to seal the interior of the cylinder against fluid escapement. The central portion of the cap and head 43 are provided with a threaded opening to receive a pipe coupling 46 which is connected with the conduit 11 communicating with the source of transmission fluid. Within the cylinder 10 there is a plunger or ram 47 having an internally threaded recess 48 in the upper end thereof which receives a flanged sleeve 49 formed at its lower end with a screw thread adapted for retention within the recess 48. The upper end of the ram 47 is shouldered to receive a cup leather 50 above which there is disposed a spacing washer 51 and a second cup leather 52. The flanged portion of the sleeve 49 is disposed for abutting engagement with the lower wall of the cup washer 52 and retains the cup washer 50, and the spacing washer 51 against vertical movement. Within the sleeve 49 there is a tube 53 having an annular groove 54 adjacent the upper end thereof which is engageable by a resilient spring ring 55 embedded in a groove 56 formed in the head 43. The groove 54 is slightly less in depth than the diameter of the wire forming the ring. The groove 56, however, is of suitable depth to permit the ready expansion of the ring 55. Thus, upon the application of adequate pressure the resilient ring will be expanded within the groove 56 and the locking engagement of the ring 55 will be broken and will permit the vertical movement of the tube within the sleeve 49. The body of the ram is bored throughout its length to receive a second plunger or ram 57, the upper portion whereof is shouldered to accommodate the assembly of a pair of cup washers 58 and 59 and a spacing washer 60 similar in structure to the sealing elements 50, 51 and 52 provided in the outer cylinder 47. The cup leathers 58 and 59 are retained in their assembled position by a sleeve 61 having an inturned flange 62 which is retained by a stud 63 supported in threaded engagement within the upper end of the ram 57. The upper portion of the stud 63 is slotted and cross-bored to receive a pair of arms 64 pivoted upon a pin 65 within the yoke portion of the stud 63. The free ends of the arms 64 are formed with spherical faces 66 which are seated within a groove 67 when the ram 57 is disposed in its retracted position. The inner faces of the arms 64 are recessed to accommodate the support of an expansible coil spring 68 which yieldingly retains the spherical faces 66 of the arms within the groove 67.

Adjacent the upper edge of the tube 53 there is a relatively shallow groove formed to frictionally retain the spherical faces of the arms 66 and provided to cause the tube to be pulled downwardly with the arms when the ram 57 is actuated in its extended position. The tube 53 is formed with aperture 135 adjacent the lower end thereof to facilitate fluid communication between the upper end of the cylinder 10 and the cylinder within which the ram 57 is mounted.

Within the lower end of the cylinder 10 there is a groove 69 having a split ring 70 therein which is engageable with a relatively shallow groove 71 formed in the ram 47. The ram 57 is likewise constructed with a shallow groove 72 engageable with a split ring 73 seated in an annular recess 74 in a bearing collar 75 threaded in the lower end of the cylinder 47. The lower free end of the ram 57 is provided with a shoe 76 of suitable proportions to provide a substantial footing for the lifting jack.

Referring now to Figures 1 and 2, it will be seen that the fluid transmission motor 15 is provided with a manifold connection 80 which is connected to a distribution valve 81 and a second manifold connection 82 which is provided to effect the return of the fluid from the control valve when the jack plungers are retracted. The distribution valve 81 is further provided with conduit couplings 83 and 84 which lead respectively to the control valve 14 and the reservoir 16. The distribution valve 81 is constructed with an actuating lever 85 having suitable linkage, such as a pull rod 86 arranged for operative control by a handle 87 mounted upon the dash of the vehicle or in some equally accessible position for the driver. The conduit 83 which leads to the control valve is arranged for fluid communication with the chamber 88 in the central body of the valve core 89 which is constructed for oscillatory adjustment within the body of the control valve 14. The valve core 89 is formed with a recess 90 in the upper portion thereof which is ported for fluid communication with the conduit couplings 91 and 92 communicating respectively with the conduits 12 and 13. The lower chamber 88 is likewise ported for fluid communication with the conduit couplings 93 and 94, being arranged for fluid communication with the respective couplings 46 mounted upon the upper ends of each of the cylinders 10 of the jacks. The wall 95 in the valve core 89, which separates the chambers 88 and 90, is apertured to facilitate the admission of fluid from the conduit 83 to the upper chamber 90.

The valve core is formed with a stem 96 having a control arm 97 thereon and an indicator finger 98 which is provided to witness the adjusted position of the valve.

As indicated in Figures 8 and 9 the valve core is adjusted in position to permit the passage of fluid through each of the ports communicating with the conduits 91, 92, 93 and 94 which facilitates the simultaneous extension of the rams within all of the jacks or the retraction thereof depending upon the position of the distribution valve 81. More specifically when the distribution valve 81 is positioned to permit the passage of fluid from the reservoir to the jacks, all of the rams will be extended and upon the reversal of the valve 81 and while the fluid is being withdrawn from the jack cylinders by the operation of the fluid displacement motor 15 the rams in each of the jacks will be retracted, thus lowering the vehicle.

Figure 10:
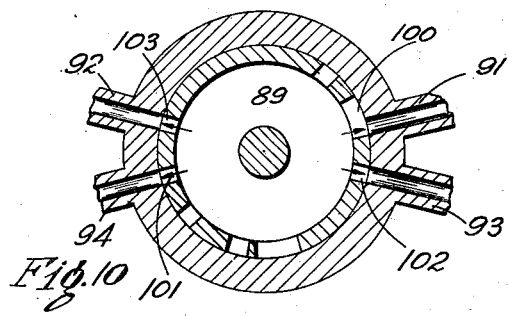
Figures 10, 11, 12, 13, 14, 15, 16 and 17 are diagrammatic sectional views of the control valve illustrating the relation of the core member with the valve body during the various adjustments thereof.

As illustrated in Figures 10 to 17 the porting of the valve core 89 is arranged to accommodate the passage of fluid through the ports in the control valve body as pre-selected through the movement of the arm 97. In Figure 10 the fluid entering the port 83 passes through the ports 100, 101, 102 and 103 which register with the passages in fluid communication with each of the cylinders of the jack units. Thus, the valve, as positioned herein, will effectuate the delivery of fluid to each of the jacks, the consequent simultaneous extension of the rams or plungers therein and the elevation of each of the wheels or the entire vehicle chassis.

Figure 11:
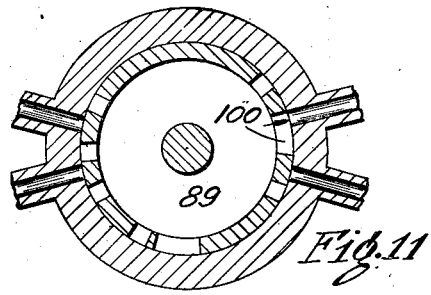

In Figure 11 it will be seen that the valve porting is arranged to permit fluid communication to one of the conduits only. The opening 100 being in registration with the conduit which leads to the vehicle jack adjacent the front right wheel.

Figure 12:
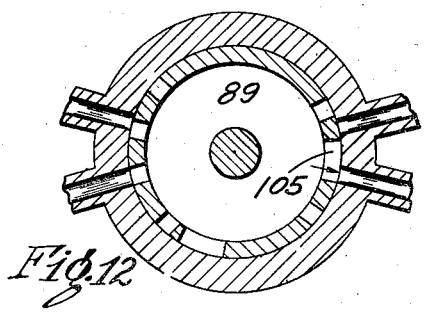

In Figure 12 the valve is adjusted to permit fluid passage from the port 105 to the conduit which leads to the jack disposed adjacent the front left wheel of the vehicle.

Figure 13:
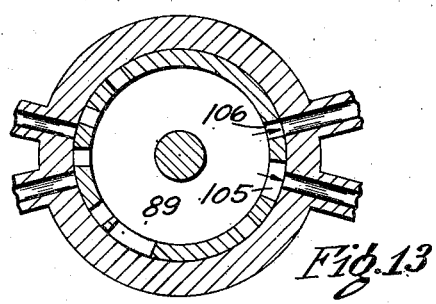

In Figure 13 the valve is disposed to permit fluid communication between ports 105 and 106 which communicate with the conduits leading to both of the jacks disposed upon the front axle.

Figure 14:
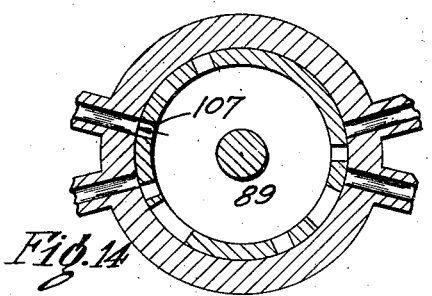

Figure 14 illustrates the valve setting for operation of the right rear jack, the adjustment herein positioning the port 107 in registration with the conduit leading to the right rear jack.

Figure 15:
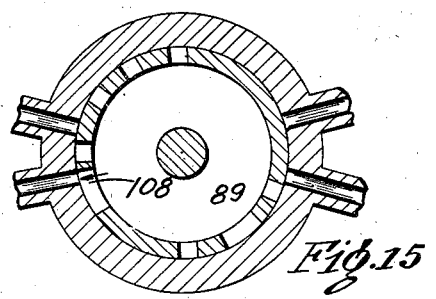

The valve, as positioned in Figure 15, is adjusted to admit the fluid through the port 108 to the left rear jack.

Figure 16:
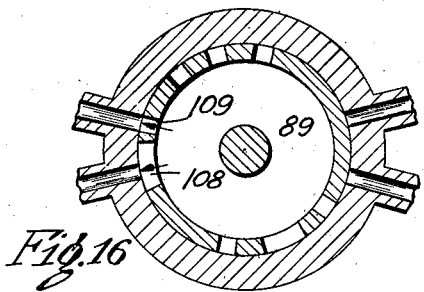

As illustrated in Figure 16 the ports 108 and 109 register with the conduits communicating with the jacks disposed upon the rear axle.

Figure 17:
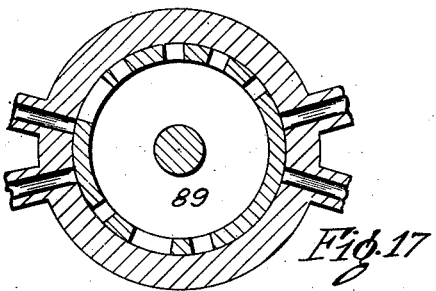
Figure 22:
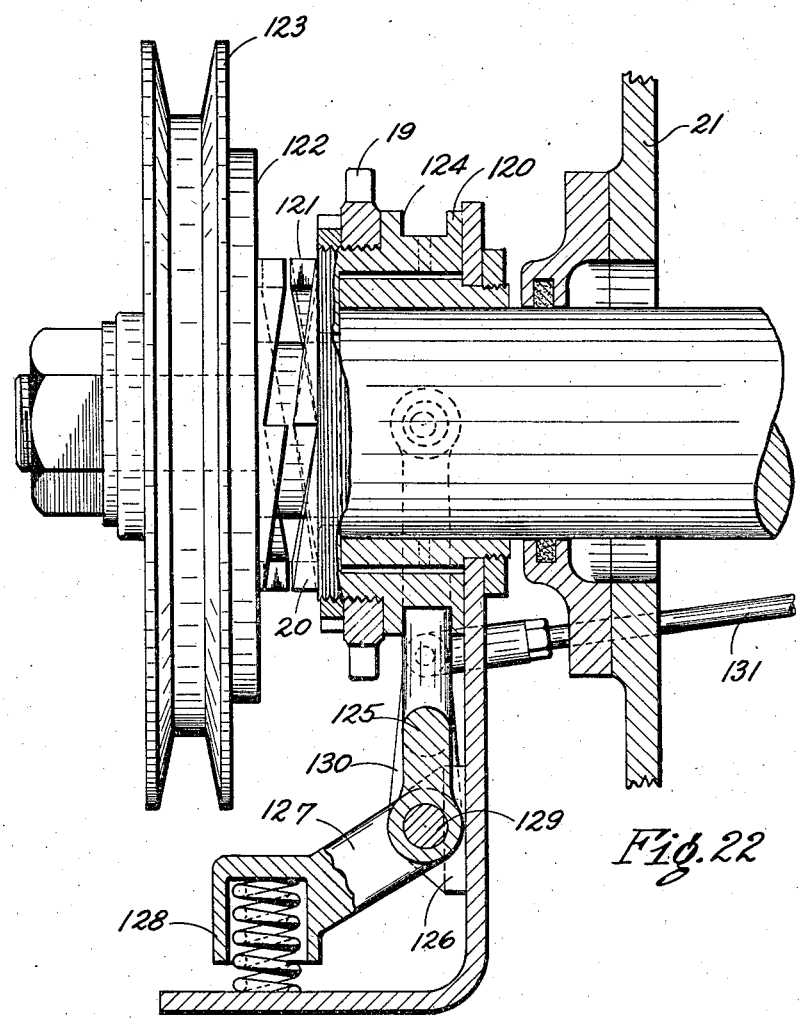
Figure 22 is a sectional view through the forward portion of the vehicle chassis illustrating the connection between the automobile engine and the fluid displacement motor.

The closed position of the valve is illustrated in Figure 17 wherein it will be seen that all of the outlet passages from the valve housing are closed by the valve core 89.

It will be understood that the illustrations in Figures 10 to 17, both inclusive, are merely diagrammatic, since, as it will be seen in Figure 8, the ports in the valve core are disposed in two parallel planes, one above the other and that the outlets in the valve housing are likewise vertically spaced.

The reversing or distribution valve comprises a housing 81 having a rotatively adjustable core 115 therein which is formed with canals 116, 117, 118 and 119. The canals 116 and 117 are disposed in substantially parallel relation, the passage 116 affording a by-pass between the conduit connections 82 and 83 while the canal 117 facilitates fluid passage between the couplings 80 and 84. The passage 119 is arranged to afford fluid passage between the couplings 80 and 83 and the passage 118 provides a connection between the couplings 82 and 84. When the valve is positioned, as illustrated in Figure 18, the fluid will be circulated under pressure from the reservoir 16 to the jack or jacks opened to fluid circulation as controlled by the valve 14. When the valve is adjusted in the position illustrated in Figure 19 the canals therein establish fluid communication between the cylinders of the jack or the jacks as pre-selected through the control valve 14 to the displacement motor, which, during this cycle of the operation, will cause the fluid to be withdrawn therefrom and pumped into the reservoir.

It will be seen that the fluid displacement motor while in operation constantly creates a partial vacuum and that fluid is withdrawn either from the reservoir or the jack cylinders with which fluid circulation is established. When the vehicle is being lowered during the early stage of the plunger retraction, the fluid in the jacks is withdrawn from the cylinders and thereafter a partial vacuum is created in the circulatory system which effects the return of the rams to their retracted position within the jack cylinders. When the vehicle wheels are elevated the fluid will be withdrawn from the tank 16 and will be forced into whatsoever jack cylinder is open in the circulatory system.

The fluid displacement motor is rotatively driven through the clutch 20 which may be connected with the vehicle fan pulley or any other accessible driving member propelled by the engine crank shaft. In the instant case the clutch comprises a sliding sleeve 120 having ratchet teeth 121 on the outer face thereof engageable with a toothed plate 122 mounted upon the fan pulley 123. The sleeve 120 is formed with a grooved recess 124 in the periphery thereof to receive a yoked arm 125 which is pivotally mounted upon a bracket 126 secured to the vehicle chassis frame. The yoke 125 is formed with a bell crank extension arm 127 which is cupped adjacent the free end thereof to receive a compression spring 128. The spring as thus arranged normally retains the clutch plate 120 disengaged from the companion plate 122 but may be readily overcome by manual manipulation of the control linkage when it is desired to engage the motor driving clutch. As illustrated, the yoke arm 125 is keyed upon a shaft 129 having a lever 130 on the free end thereof. The lever 130 is connected with a rod 131 upon the end of which there is a control knob 87 preferably mounted upon the vehicle dash at some position accessible to the vehicle operator. The control knob 87 may be provided with a detent or plunger or a similar locking device which will overcome the spring 128 and retain the clutch in its disengaged position. The reversing valve linkage may be likewise provided with a control knob if desired, which may be arranged upon the dash adjacent the control knob 87.

Although the foregoing description is necessarily of a detailed character, in order that the invention may be completely set forth, it is to be understood that the specific terminology is not intended to be restrictive or confining, and that various rearrangements of parts and modifications of structural detail may be resorted to without departing from the scope or spirit of the invention as herein claimed.

I claim:

1. A fluid operated jack, comprising a cylinder, a plunger therein, a transversely disposed rib on the periphery of said cylinder, a plate adapted to support said cylinder, said plate having a plurality of spaced grooves in the face thereof for receiving the rib in said cylinder, a second plate adapted for support upon a vehicular axle, and a pivoted connection between the said first and second named plate.

2. A fluid operated jack, comprising a cylinder, a plunger therein, a transversely disposed rib on the periphery of said cylinder, a plate adapted to support said cylinder, said plate having a plurality of spaced grooves in the face thereof for receiving the rib in said cylinder, a second plate adapted for support upon a vehicular axle, a pivoted connection between the first named plate and the second plate, and a compression spring mounted in one of said plates arranged to position the jack cylinder normal to the axle when the jack is adjusted in its inoperative position.

3. In combination with a vehicle chassis, fluid operated jacks mounted upon the vehicle axles adjacent each wheel, said jacks comprising a cylinder having a ram reciprocatively mounted therein, a pivoted connection between the jack and said axle arranged for limited oscillatory movement parallel the vehicle axle, said connections embodying a plate adapted for affixation upon said axle and having an arcuate slot therein, a pin mounted in said plate, a block adapted to support said cylinder and pivotally mounted upon said plate by said pin, said pin being disposed within the medial axis of said cylinder, a stud mounted in said block and extended within said slot, a spring within said slot and engaging said stud, said pin being eccentrically disposed in relation to the medial axis of said cylinder in order to accommodate the use of a spring to facilitate the oscillatory movement of the jack and to maintain the jack normal to the axle when the jack is in its inoperative position.

4. A fluid operated jack comprising a cylinder, a plunger therein, a second plunger within the first named plunger, means for circulating fluid under pressure to said cylinder to extend said plungers and withdrawing said fluid and retracting said plungers, a tube disposed between said first named plunger and said second named plunger and having apertures thereby effecting a fluid communication between the first named plunger and the second named plunger, a pair of spring pressed pivotally mounted arms engageable within a groove in the first named plunger and connected with the second named plunger for yieldingly retaining said plunger in its elevated position, and a groove adjacent the end of said tube adapted for engagement with said arms so that said tube will be drawn downwardly with the inner plunger upon the extended movement thereof and fluid communication between the first and second named cylinder effected through said apertures.

5. In combination with a vehicle chassis, fluid operated jacks comprising a cylinder, a ram reciprocatively mounted therein, a pivotal connection between said cylinder and one of the axles of said vehicle chassis, said pivotal connection comprising a block formed to retain said cylinder, a stud extended from said block, a plate affixed to said axle and having an arcuate slot therein, a pin coordinated with said block and said plate to facilitate the oscillatory movement of said cylinder in a plane parallel the axis of said axle and a spring within said slot in said block engaging the stud to maintain the cylinder in a vertical position.

MICHIAL A. TIRABASSO.